(12) United States Patent
Terao

(10) Patent No.: US 10,619,753 B2
(45) Date of Patent: Apr. 14, 2020

(54) PILOT TYPE SWITCHING VALVE

(71) Applicant: KYB Corporation, Tokyo (JP)

(72) Inventor: Takeshi Terao, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 16/068,926

(22) PCT Filed: Sep. 16, 2016

(86) PCT No.: PCT/JP2016/077580
§ 371 (c)(1),
(2) Date: Jul. 10, 2018

(87) PCT Pub. No.: WO2017/130455
PCT Pub. Date: Aug. 3, 2017

(65) Prior Publication Data
US 2019/0024811 A1    Jan. 24, 2019

(30) Foreign Application Priority Data

Jan. 28, 2016  (JP) .................................. 2016-013993

(51) Int. Cl.
| F16K 17/04 | (2006.01) |
| F16K 17/02 | (2006.01) |
| F16K 3/26 | (2006.01) |
| F15B 11/00 | (2006.01) |
| F15B 11/028 | (2006.01) |
| F15B 13/02 | (2006.01) |

(52) U.S. Cl.
CPC .............. *F16K 17/02* (2013.01); *F15B 11/00* (2013.01); *F15B 11/028* (2013.01); *F16K 3/26* (2013.01); *F15B 13/024* (2013.01)

(58) Field of Classification Search
CPC .. F16K 17/02; F16K 3/26; F15B 11/00; F15B 11/028; F15B 13/024
USPC ............... 137/488, 490, 492.5, 489.5, 596.2, 137/625.68, 625.69, 625.34, 625.35, 137/625.36, 877, 878
See application file for complete search history.

(56) References Cited

U.S. PATENT DOCUMENTS 2,037,179 A * 4/1936 Robart ................. G05D 16/166
                                                    137/489.5
3,884,253 A * 5/1975 Murata ............... F15B 13/0839
                                                     137/110

(Continued)

FOREIGN PATENT DOCUMENTS

| JP | S49-31118 Y1 | 8/1974 |
| JP | H01-102131 A | 4/1989 |
| JP | H05-321907 A | 12/1993 |

*Primary Examiner* — Minh Q Le
(74) *Attorney, Agent, or Firm* — Rabin & Berdo, P.C.

(57) ABSTRACT

A pilot type switching valve includes: a housing bore formed in a valve body, the housing bore having an opening end; a spool slidably housed in the housing bore, the spool being configured to allow or block a flow of the working fluid to a first relief valve; a pilot chamber to which pilot pressure biasing the spool in the valve opening direction is guided; and a spring configured to bias the spool in the valve closing direction. The spool has a bottom surface on which the pilot pressure acts in such a manner that the spool is biased in the valve opening direction, and the area of the bottom surface is smaller than the sectional area of the housing bore.

6 Claims, 4 Drawing Sheets

(56) References Cited

U.S. PATENT DOCUMENTS

| | | | |
|---|---|---|---|
| 5,709,368 A * | 1/1998 | Hajek, Jr. | F15B 13/0405 |
| | | | 251/30.02 |
| 5,813,310 A * | 9/1998 | Hori | E02F 9/2221 |
| | | | 91/446 |
| 10,233,614 B2 * | 3/2019 | Isogai | E02F 9/22 |
| 2012/0145252 A1 * | 6/2012 | Hunnicutt | F15B 13/0402 |
| | | | 137/14 |
| 2015/0167276 A1 * | 6/2015 | Brinkley | E02F 9/2285 |
| | | | 137/596.16 |

* cited by examiner

PILOT TYPE SWITCHING VALVE

TECHNICAL FIELD

The present invention relates to a pilot type switching valve.

BACKGROUND ART

JP01-102131A describes a hydraulic circuit in which a relief valve is provided on a flow passage branching from a flow passage which provides communication between a hydraulic pump and an assembled switching valve via a hydraulic pilot type switching valve.

SUMMARY OF INVENTION

In this type of hydraulic circuit, a valve having a structure in which a pilot chamber is provided on one end surface of a valve element formed in a cylindrical shape and a bias spring is provided on the other end surface is used as a pilot type switching valve.

In the hydraulic circuit described in JP01-102131A, in order to ensure a relief flow rate of the relief valve, there is a need for increasing a flow rate of the hydraulic pilot type switching valve. When the flow rate is ensured by using the pilot type switching valve having the above structure, the diameter of the valve element is required to be increased. However, when the diameter of the valve element is increased, the pressure receiving area of the valve element in a pilot chamber is increased. Thus, bias force by pressure in the pilot chamber is also increased. Thereby, there is a need for increasing bias force of the bias spring provided on the other end surface of the valve element in conformity to this. Thus, there is a risk that the size of the pilot type switching valve is increased.

An object of the present invention is to provide a pilot type switching valve capable of suppressing the size increase while ensuring a relief flow rate.

According to an aspect of the present invention, a pilot type switching valve provided on the upstream side of a relief valve to be opened to discharge a working fluid to a tank when pressure of a supply flow passage connected to a pump reaches a predetermined value, the pilot type switching valve includes: a valve body; a housing bore formed in the valve body, the housing bore having an opening end; a valve element slidably housed in the housing bore, the valve element being configured to allow or block a flow of the working fluid to the relief valve; a pilot chamber to which pilot pressure biasing the valve element in the valve opening direction is guided; and a bias member configured to bias the valve element in the valve closing direction. The valve element has a pressure receiving surface on which the pilot pressure acts in such a manner that the valve element is biased in the valve opening direction, and the area of the pressure receiving surface is smaller than the sectional area of the housing bore.

DESCRIPTION OF EMBODIMENTS

First Embodiment

Figure 1:
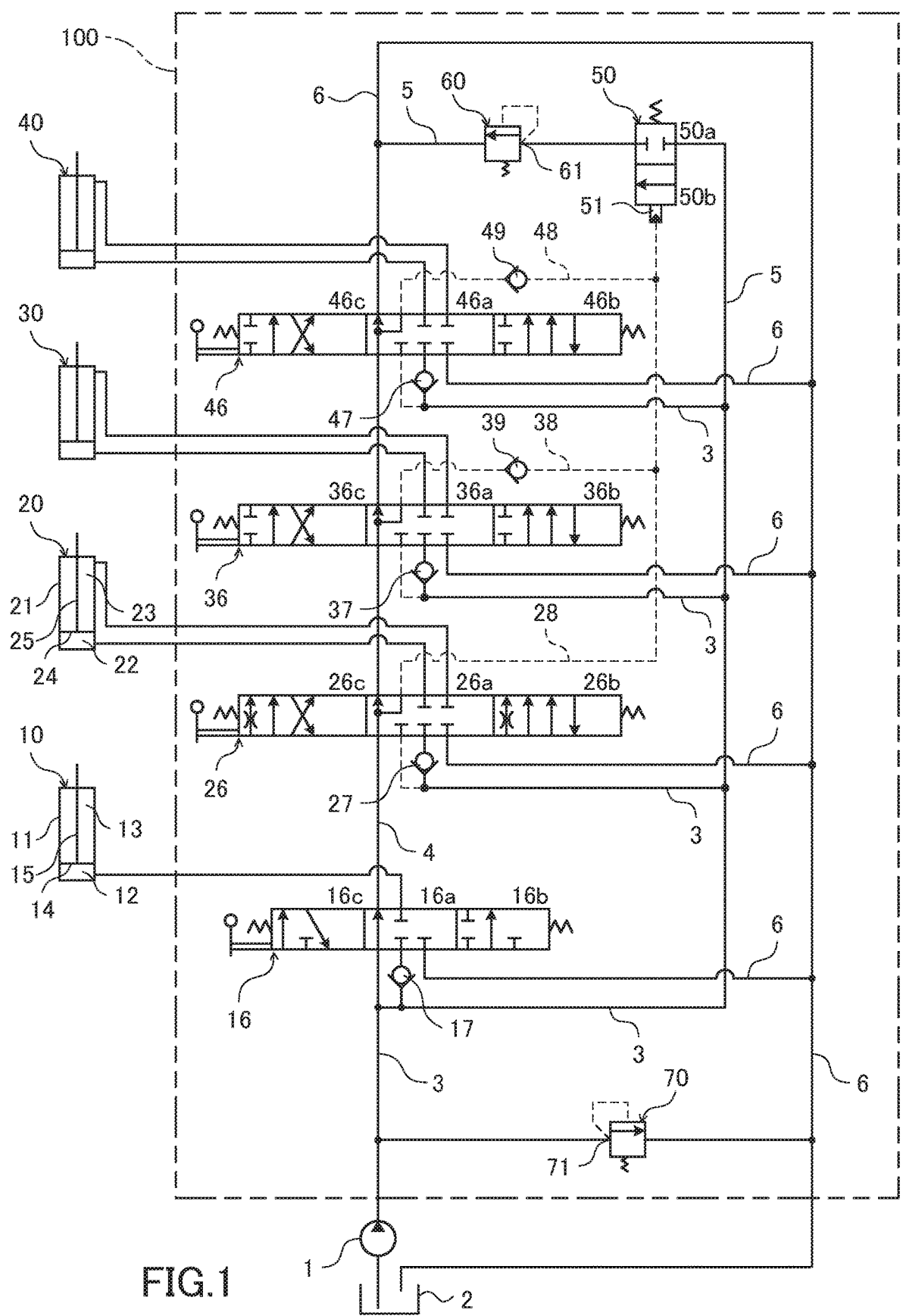
FIG. 1 is a hydraulic circuit diagram in which a pilot type switching valve according to a first embodiment of the present invention is used.

Hereinafter, a pilot type switching valve 50 according to a first embodiment of the present invention will be described with reference to the drawings. An example where a pilot type switching valve 50 is applied to a fluid pressure control device 100 to be mounted on a forklift will be described below. However, the present invention can also be applied to various devices other than the forklift.

Firstly, with reference to FIG. 1, the fluid pressure control device 100 to which the pilot type switching valve 50 is applied will be described.

The fluid pressure control device 100 controls work of a lift cylinder 10 that lifts and lowers a fork, a tilt cylinder 20 that changes an inclination angle of a mast, and attached equipment actuators 30, 40 that move other attached equipment. The other attached equipment includes a fork positioner that adjusts intervals of the fork.

Pressure upper limit values are respectively set for the lift cylinder 10, the tilt cylinder 20, and the attached equipment actuators 30, 40, and it is desired that pressure which is higher than the pressure upper limit values does not act on these cylinders 10, 20, 30, 40. Since the lift cylinder 10 brings up the fork and a cargo, the lift cylinder has the pressure upper limit value which is higher than the pressure upper limit values of the tilt cylinder 20 and the attached equipment actuators 30, 40. In the description of the present specification, the lift cylinder 10 is also referred to as a high pressure actuator, and the tilt cylinder 20 and the attached equipment actuators 30, 40 are also referred to as low pressure actuators.

As shown in FIG. 1, the fluid pressure control device 100 includes a supply flow passage 3, a first control valve 16 provided in the supply flow passage 3, and a plurality of second control valves 26, 36, 46 provided in the supply flow passage 3. The supply flow passage 3 guides working oil serving as a working fluid discharged from a pump 1 to the lift cylinder 10, the tilt cylinder 20, and the attached equipment actuators 30, 40. The first control valve 16 controls the work of the lift cylinder 10. The plurality of second control valves 26, 36, 46 respectively controls the work of the tilt cylinder 20 and the attached equipment actuators 30, 40.

The fluid pressure control device 100 also includes a bypass passage 4 communicating with the supply flow passage 3 on the upstream side of the first and second control valves 16, 26, 36, 46. In a case where all the first and second control valves 16, 26, 36, 46 are at neutral positions, the bypass passage 4 guides the working oil discharged from the pump 1 to a tank 2 through the first and second control valves 16, 26, 36, 46 and a discharge passage 6.

The lift cylinder 10 is a single acting type cylinder having a piston 14 that partitions an interior of a cylinder tube 11 into a bottom side chamber 12 and a head side chamber 13. A rod 15 is attached to the piston 14. The first control valve 16 is a three-position five-port switching valve having a neutral position 16a at which the work of the lift cylinder 10 is stopped, a lifting position 16b at which the rod 15 is lifted, and a lowering position 16c at which the rod 15 is lowered. Hereinafter, the lifting position 16b will also be referred to as the working position.

In a case where the first control valve 16 is at the neutral position 16a, the first control valve 16 blocks a flow of the working oil in the supply flow passage 3 and allows a flow of the working oil in the bypass passage 4. In this case, the lift cylinder 10 is not actuated.

In a case where the first control valve 16 is at the lifting position 16b, the first control valve 16 allows the flow of the working oil in the supply flow passage 3 and blocks the flow of the working oil in the bypass passage 4. In this case, the bottom side chamber 12 communicates with the supply flow passage 3 and the working oil is supplied from the pump 1 to the bottom side chamber 12. As a result, the rod 15 is lifted.

In a case where the first control valve 16 is at the lowering position 16c, the first control valve 16 blocks the flow of the working oil in the supply flow passage 3 and allows the flow of the working oil in the bypass passage 4. In this case, the bottom side chamber 12 communicates with the discharge passage 6 through the first control valve 16, and the working oil in the bottom side chamber 12 is guided to the tank 2 through the first control valve 16 and the discharge passage 6. As a result, the rod 15 is lowered by gravitational force acting on the piston 14, the rod 15, and the fork.

The tilt cylinder 20 is a double acting type cylinder having a piston 24 that partitions an interior of a cylinder tube 21 into a bottom side chamber 22 and a head side chamber 23. A rod 25 is attached to the piston 24. The second control valve 26 is a three-position eight-port switching valve having a neutral position 26a at which the work of the tilt cylinder 20 is stopped, a forward inclination position 26b at which the tilt cylinder 20 is actuated to incline the mast forward, and a rearward inclination position 26c at which the tilt cylinder 20 is actuated to incline the mast rearward. Hereinafter, the forward inclination position 26b and the rearward inclination position 26c will also be referred to as the working positions.

In a case where the second control valve 26 is at the neutral position 26a, the second control valve 26 blocks the flow of the working oil in the supply flow passage 3 and allows the flow of the working oil in the bypass passage 4. In this case, the tilt cylinder 20 is not actuated.

In a case where the second control valve 26 is at the forward inclination position 26b, the second control valve 26 allows the flow of the working oil in the supply flow passage 3 and restricts the flow of the working oil in the bypass passage 4. In this case, the bottom side chamber 22 communicates with the supply flow passage 3, and the head side chamber 23 communicates with the discharge passage 6 through the second control valve 26. The working oil is supplied from the pump 1 to the bottom side chamber 22, and the working oil of the head side chamber 23 is discharged to the tank 2. As a result, the rod 25 is moved with respect to the cylinder tube 21, and the mast coupled to the tilt cylinder 20 is inclined forward.

In a case where the second control valve 26 is at the rearward inclination position 26c, the second control valve 26 allows the flow of the working oil in the supply flow passage 3 and restricts the flow of the working oil in the bypass passage 4. In this case, the bottom side chamber 22 communicates with the discharge passage 6 through the second control valve 26, and the head side chamber 23 communicates with the supply flow passage 3. The working oil is supplied from the pump 1 to the head side chamber 23, and the working oil of the bottom side chamber 22 is discharged to the tank 2. As a result, the rod 25 is moved with respect to the cylinder tube 21, and the mast coupled to the tilt cylinder 20 is inclined rearward.

The attached equipment actuators 30, 40 are double acting type cylinders, and the second control valves 36, 46 are three-position eight-port switching valves. Since structures of the attached equipment actuators 30, 40 and the second control valves 36, 46 are the same as those of the tilt cylinder 20 and the second control valve 26, description thereof will be omitted.

A check valve 17 prevents the working oil of the lift cylinder 10 from flowing back to the supply flow passage 3 in a case where the first control valve 16 is at the working position 16b. Check valves 27, 37, 47 respectively prevent the working oil of the tilt cylinder 20 and the attached equipment actuators 30, 40 from flowing back to the supply flow passage 3 in a case where the second control valves 26, 36, 46 are at the working positions 26b, 26c, 36b, 36c, 46b, 46c as well as the check valve 17.

In the present embodiment, the single acting type cylinder is used as the lift cylinder 10, and the double acting type cylinders are used as the tilt cylinder 20 and the attached equipment actuators 30, 40. However, the present invention is not limited to this mode. The lift cylinder 10 may be a double acting type cylinder or other types of fluid pressure actuators. The tilt cylinder 20 and the attached equipment actuators 30, 40 may be single acting type cylinders or other types of fluid pressure actuators.

The first and second control valves 16, 26, 36, 46 are respectively not limited to the three-position five-port switching valve and the three-position eight-port switching valves but may be other types of valves.

The fluid pressure control device 100 also includes a branching passage 5 branching from the supply flow passage 3 on the upstream side of the first and second control valves 16, 26, 36, 46, the pilot type switching valve 50 provided in the branching passage 5, and a first relief valve 60 provided in the branching passage 5 on the downstream side of the pilot type switching valve 50.

The branching passage 5 bypasses the first and second control valves 16, 26, 36, 46 and is connected to the bypass passage 4 and the discharge passage 6. Therefore, in a case where at least one of the first and second control valves 16, 26, 36, 46 blocks the flow of the working oil in the bypass passage 4, the working oil discharged from the pump 1 is guided to the pilot type switching valve 50 through the branching passage 5.

The pilot type switching valve 50 is a two-position two-port switching valve having a blocking position 50a at which a flow of the working oil in the branching passage 5 is blocked, and a communication position 50b at which the flow of the working oil in the branching passage 5 is allowed. The pilot type switching valve 50 has a pilot chamber 51, and in accordance with supply of the working oil to the pilot chamber 51, the switching valve is switched between the blocking position 50a and the communication position 50b. The pilot chamber 51 and the second control valves 26, 36, 46 are respectively connected by pilot passages 28, 38, 48. Pressure of the supply flow passage 3 is supplied as pilot pressure to the pilot chamber 51 through the second control valves 26, 36, 46.

In the present embodiment, in a case where the second control valves 26, 36, 46 are at the neutral positions 26a, 36a, 46a, the second control valves 26, 36, 46 separate the pilot passages 28, 38, 48 from the supply flow passage 3 and connect the pilot passages 28, 38, 48 to the bypass passage 4. That is, in a case where the second control valves 26, 36, 46 are at the neutral positions 26a, 36a, 46a, the second control valves 26, 36, 46 block supply of the working oil from the supply flow passage 3 to the pilot chamber 51 and allows a flow of the working oil from the pilot chamber 51 to the bypass passage 4.

In a case where the second control valves 26, 36, 46 are at the working positions 26b or 26c, 36b or 36c, 46b or 46c, the second control valves 26, 36, 46 connect the pilot passages 28, 38, 48 to the supply flow passage 3 and separate the pilot passages 28, 38, 48 from the bypass passage 4. That is, in a case where the second control valves 26, 36, 46 are at the working positions 26b or 26c, 36b or 36c, 46b or 46c, the second control valves 26, 36, 46 allow the supply of the working oil from the supply flow passage 3 to the pilot chamber 51 and block the flow of the working oil from the pilot chamber 51 to the bypass passage 4.

A check valve 39 blocks a flow of the working oil from the pilot chamber 51 to the second control valve 36, and a check valve 49 blocks a flow of the working oil from the pilot chamber 51 to the second control valve 46. Instead of providing the check valves 39, 49 in the pilot passages 38, 48, the pilot passages 38, 48 may be preliminarily separated from the bypass passage 4.

No check valve is provided in the pilot passage 28 communicating with the bypass passage 4 on the upstream side of the second control valves 36, 46. This is to prevent the situation that pressure is kept in the pilot chamber 51 and the pilot type switching valve 50 is maintained at the communication position 50b. Even when no check valve is provided in the pilot passage 28 but for example when the second control valve 36 is at the working position 36b or 36c, the bypass passage 4 is blocked. Thus, the working oil in the pilot chamber 51 is not discharged to the tank 2 through the pilot passage 28.

The first relief valve 60 is closed when the pressure in an inlet port 61 of the first relief valve 60 is equal to or less than a first pressure limit value, and opened when the pressure in the inlet port 61 reaches the first pressure limit value. When the first relief valve 60 is opened, the working oil is guided from the branching passage 5 to the discharge passage 6 through the first relief valve 60. Therefore, the pressure in the branching passage 5 is restricted so as to be equal to or less than the first pressure limit value. That is, the first relief valve 60 restricts the pressure in the branching passage 5 so as to be equal to or less than the first pressure limit value in a case where a flow of the working oil to the first relief valve 60 is allowed.

In the present embodiment, the first relief valve 60 is provided in the branching passage 5. Thus, there is no need for forming flow passages from the supply flow passage 3 to the first relief valve 60 respectively in the second control valves 26, 36, 46. The area of the flow passages running from the supply flow passage 3 to the pilot chamber 51 through the second control valves 26, 36, 46 (pilot passages 28, 38, 48) is sufficient if the amount of the working oil corresponding to the volume of the pilot chamber 51 can flow through the flow passages. Thus, the area of the flow passages may be small, so that the second control valves 26, 36, 46 can be downsized. Therefore, the fluid pressure control device 100 can be more downsized.

The fluid pressure control device 100 further includes a second relief valve 70 provided on the upstream side of the pilot type switching valve 50. The second relief valve 70 restricts the pressure in the supply flow passage 3 to a value equal to or less than a second pressure limit value which is higher than the first pressure limit value.

More specifically, the second relief valve 70 is closed when the pressure in an inlet port 71 of the second relief valve 70 is equal to or less than the second pressure limit value, and opened when the pressure in the inlet port 71 reaches the second pressure limit value. When the second relief valve 70 is opened, the working oil is guided from the supply flow passage 3 to the discharge passage 6 through the second relief valve 70. Therefore, the pressure in the supply flow passage 3 is restricted so as to be equal to or less than the second pressure limit value.

In the embodiment shown in FIG. 1, the second relief valve 70 is provided in a flow passage branching from the supply flow passage 3. However, the second relief valve 70 may be provided in a flow passage branching from the branching passage 5 on the upstream side of the pilot type switching valve 50.

Next, with reference to FIG. 2, specific configurations of the pilot type switching valve 50 will be described.

The pilot type switching valve 50 includes a valve body 52, a housing bore 53 formed in the valve body 52, the housing bore 53 having an opening end 53a, a spool 54 serving as a valve element slidably housed in the housing bore 53, the spool 54 being configured to allow or block the flow of the working oil to the first relief valve 60, the pilot chamber 51 to which pilot pressure biasing the spool 54 in the valve opening direction is guided, a spring 55 serving as a bias member configured to bias the spool 54 in the valve closing direction, and a plug 56 closing the opening end 53a, the plug 56 being fixed to the valve body 52.

The spool 54 includes an insertion borehole 54a opened on an end surface which faces the plug 56 and formed to extend in the axial direction of the spool 54, and a land portion 54c configured to block or allow a flow of the working oil in the branching passage 5. A piston 57 is slidably inserted into the insertion borehole 54a, and the pilot chamber 51 is formed between a bottom surface 54b of the insertion borehole 54a and an end surface 57a of the piston 57. A communication passage 54d providing communication between the pilot chamber 51 and the pilot passages 28, 38, 48 is formed in the spool 54.

The working oil (pilot pressure) flowing into the pilot chamber 51 acts on the bottom surface 54b of the insertion borehole 54a and the end surface 57a of the piston 57. Therefore, the bottom surface 54b of the insertion borehole 54a functions as a pressure receiving surface on which the pilot pressure acts in such a manner that the spool 54 is biased in the valve opening direction. When the pilot pressure acts on the bottom surface 54b of the insertion borehole 54a, the spool 54 moves in the right direction in FIG. 2 while compressing the spring 55, and the land portion 54c allows the flow of the working oil in the branching passage 5.

Figure 2:
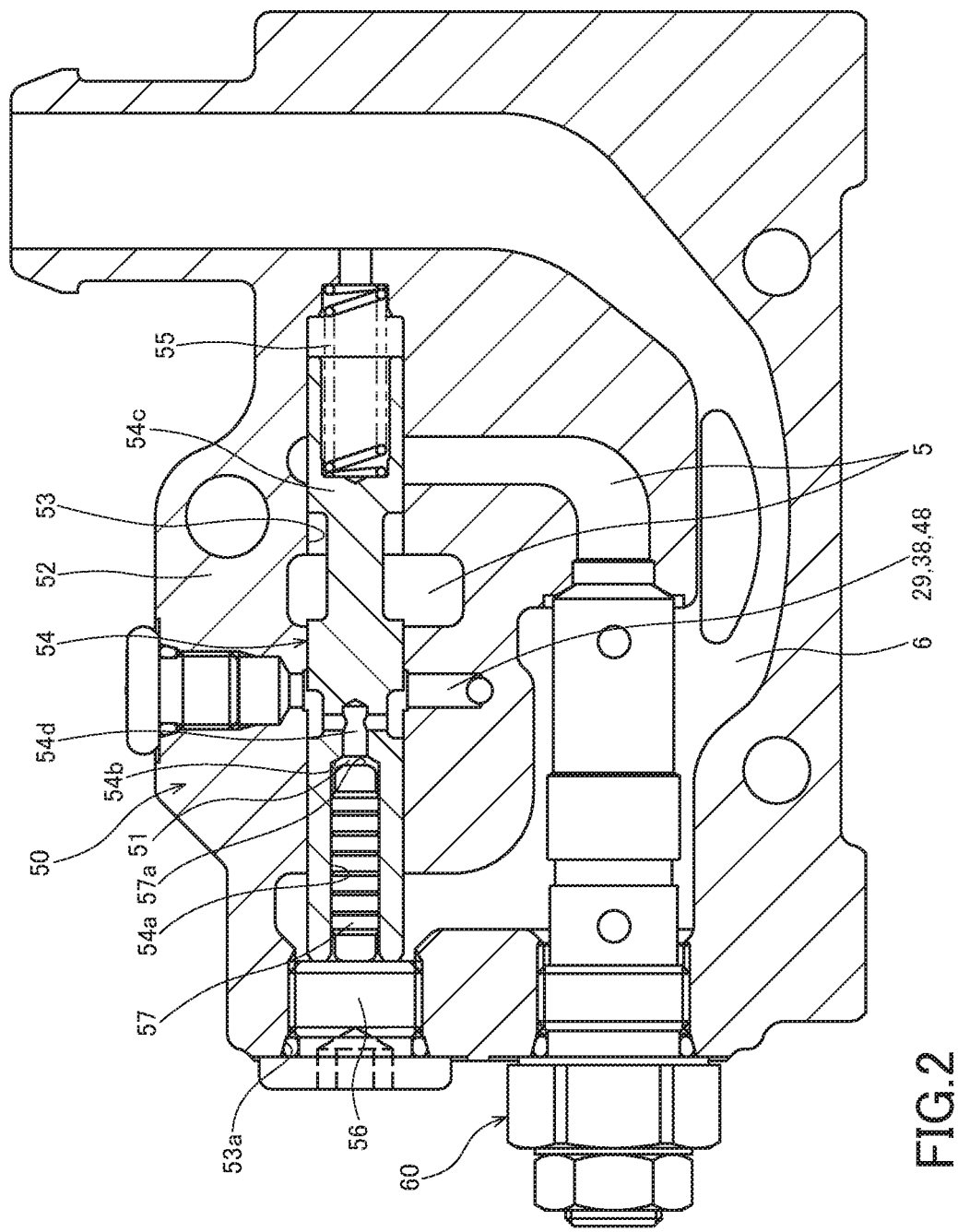
FIG. 2 is a sectional view of a structure of the pilot type switching valve according to the first embodiment of the present invention.

The piston 57 tries to move in the left direction in FIG. 2 by the pilot pressure acting on the end surface 57a. However, due to abutment with the plug 56, movement of the piston 57 is restricted.

Since the bottom surface 54b of the insertion borehole 54a functions as the pressure receiving surface, the area of receiving the pilot pressure can be reduced in comparison to, for example, a case where the spool 54 is solid (the spool in which no insertion borehole 54a is provided) and the pilot pressure acts on the entire end surface (the end surface having the area which is substantially equal to the sectional area of the housing bore 53) of the spool 54.

In the fluid pressure control device 100, there is a demand that the relief flow rate of the first relief valve 60 is ensured. As a measure for the demand, it is thought that the diameter of the spool 54 is increased in the pilot type switching valve 50 in order to increase the flow passage area of the pilot type switching valve 50 provided on the upstream side of the first relief valve 60. However, when the diameter of the spool 54 is increased, the pressure receiving area in the pilot chamber is increased in accordance with the diameter increase. Thus, bias force in the valve opening direction received from the working oil in the pilot chamber is also increased. Further, the size of the spring 55 configured to bias in the valve closing direction is accordingly increased as well. As a result, the size of the entire device is increased. Therefore, in the present embodiment, in order to make the area of the pressure receiving surface receiving the pilot pressure smaller than the sectional area of the housing bore 53 in such a manner that the spool 54 is biased in the valve opening direction, the pilot chamber 51 is formed inside the spool 54. That is, the pilot chamber 51 is formed between the bottom surface 54b of the insertion borehole 54a and the end surface 57a of the piston 57. In such a way, since the pilot chamber 51 is formed inside the spool 54, the area of receiving the pilot pressure of the spool 54 can be reduced in comparison to the above configuration where the pilot pressure acts on the entire end surface (the end surface having the area which is substantially equal to the sectional area of the housing bore 53) of the spool 54, and the bias force biasing the spool 54 in the valve opening direction can be reduced. Thereby, bias force in the valve closing direction set against this bias force in the valve opening direction can also be reduced. That is, the spring 55 configured to bias the spool 54 in the valve closing direction can be downsized. Therefore, even when the diameter of the spool 54 is increased in order to ensure the relief flow rate of the first relief valve 60, there is no need for increasing the size of the spring 55 in accordance with the diameter increase. Thus, by making the area of the pressure receiving surface (bottom surface 54b) of the pilot chamber 51 smaller than the sectional area of the housing bore 53, the increase in the size of the pilot type switching valve 50 can be suppressed while ensuring the relief flow rate of the first relief valve 60.

Next, with reference to FIG. 1, actions of the fluid pressure control device 100 will be described.

Firstly, a case where at least one of the second control valves 26, 36, 46 is at the working position 26b, 26c, 36b, 36c, 46b, or 46c will be described.

In a case where the second control valve 26 is at the forward inclination position 26b, that is, in a case where the second control valve 26 allows a flow of the working oil to the tilt cylinder 20, the second control valve 26 allows the supply of the working oil from the supply flow passage 3 to the pilot chamber 51. Since the check valves 39, 49 block the flow of the working oil from the pilot passages 38, 48 to the second control valves 36, 46, the working oil flowing from the supply flow passage 3 into the valve body 52 through the pilot passage 28 is supplied to the pilot chamber 51 through the communication passage 54d (refer to FIG. 2), and the pilot type switching valve 50 is switched to the communication position 50b. Thereby, the pilot type switching valve 50 allows the flow of the working oil in the branching passage 5. As a result, the flow of the working oil to the first relief valve 60 is allowed.

Since the branching passage 5 communicates with the supply flow passage 3, the first relief valve 60 restricts the pressure in the branching passage 5 and the supply flow passage 3 so as to be equal to or less than the first limit value. Therefore, even when the tilt cylinder 20 communicates with the supply flow passage 3, the pressure exceeding the first pressure limit value can be prevented from acting on the tilt cylinder 20.

By setting the first pressure limit value so as to be equal to or less than the pressure upper limit value of the tilt cylinder 20, the pressure exceeding the pressure upper limit value of the tilt cylinder 20 does not act on the tilt cylinder 20. Thereby, damage to the tilt cylinder 20 can be prevented.

In such a way, in the present embodiment, in a case where the second control valve 26 allows the flow of the working oil to the tilt cylinder 20, the second control valve 26 allows the supply of the working oil to the pilot chamber 51. Thus, the working oil is supplied to the pilot chamber 51. As a result, the pilot type switching valve 50 allows the flow of the working oil to the first relief valve 60, and the first relief valve 60 restricts the pressure in the branching passage 5 so as to be equal to or less than the first pressure limit value. Since the branching passage 5 communicates with the supply flow passage 3, the pressure in the supply flow passage 3 is restricted so as to be equal to or less than the first pressure limit value by the first relief valve 60. Therefore, the pressure exceeding the first pressure limit value can be prevented from acting on the tilt cylinder 20.

In a case where the second control valves 36, 46 are at the working positions 36b or 36c, 46b or 46c, as well as a case where the second control valve 26 is at the working position 26b or 26c, the pressure exceeding the first pressure limit value can be prevented from acting on the attached equipment actuators 30, 40. Therefore, damage to the attached equipment actuators 30, 40 can be prevented.

The pressure in the supply flow passage 3 is restricted so as to be equal to or less than the first pressure limit value irrespective of the position of the first control valve 16. Therefore, even in a case where the high pressure actuator 10 and at least one of the low pressure actuators 20, 30, 40 are actuated, the pressure exceeding the first pressure limit value can be prevented from acting on the low pressure actuators 20, 30, 40.

Next, a case where all the second control valves 26, 36, 46 are at the neutral positions 26a, 36a, 46a will be described.

In a case where the second control valve 26 is at the neutral position 26a, that is, in a case where the second control valve 26 blocks the flow of the working oil to the tilt cylinder 20, the second control valve blocks the supply of the working oil from the supply flow passage 3 to the pilot chamber 51. In this case, the second control valve 26 allows the flow of the working oil from the pilot chamber 51 to the bypass passage 4. In a case where the second control valves 36, 46 are at the neutral positions 36a, 46a, the second control 36, 46 valves block the supply of the working oil from the supply flow passage 3 to the pilot chamber 51 as well as the second control valve 26.

In a case where all the second control valves 26, 36, 46 are at the neutral positions 26a, 36a, 46a, the pilot chamber 51 communicates with the tank 2 through the bypass passage 4 and the discharge passage 6. Therefore, the working oil is not supplied to the pilot chamber 51, and the pilot type switching valve 50 is switched to the blocking position 50a. At the blocking position 50a, the flow of the working oil in the branching passage 5 is blocked. As a result, the flow of the working oil to the first relief valve 60 is blocked.

Since the working oil does not flow to the first relief valve 60, the pressure in the supply flow passage 3 is not restricted by the first pressure limit value. That is, the pressure of the supply flow passage 3 can be increased more than the first pressure limit value. Therefore, when the first control valve 16 is switched to the lifting position 16b and the lift cylinder 10 is extended, the pressure exceeding the first pressure limit value can act on the lift cylinder 10.

A flow of the working oil from the supply flow passage 3 to the second relief valve 70 is not blocked irrespective of the positions of the first and second control valves 16, 26, 36, 46. Therefore, the pressure in the supply flow passage 3 is restricted so as to be equal to or less than the second pressure limit value. Even when the lift cylinder 10 communicates with the supply flow passage 3, the pressure exceeding the second pressure limit value can be prevented from acting on the lift cylinder 10.

In such a way, the second relief valve 70 is provided on the upstream side of the pilot type switching valve 50. Thus, the pressure in the supply flow passage 3 is restricted so as to be equal to or less than the second pressure limit value by the second relief valve 70. Therefore, even in a case where the first relief valve 60 does not restrict the pressure in the supply flow passage 3, the pressure of the second pressure limit value or higher can be prevented from acting on the lift cylinder 10.

By setting the second pressure limit value so as to be equal to or less than the pressure upper limit value of the lift cylinder 10, the pressure exceeding the pressure upper limit value of the lift cylinder 10 does not act on the lift cylinder 10. As a result, damage to the lift cylinder 10 can be prevented.

Although the fluid pressure control device 100 according to the present embodiment includes the one first control valve 16 configured to control the work of the one high pressure actuator 10, the fluid pressure control device 100 is not limited to this mode. The fluid pressure control device 100 may include a plurality of first control valves configured to respectively control work of a plurality of high pressure actuators.

The fluid pressure control device 100 includes the plurality of second control valves 26, 36, 46 configured to respectively control the work of the plurality of low pressure actuators 20, 30, 40. However, the fluid pressure control device may include one second control valve 26 configured to control work of one low pressure actuator.

Further, the branching passage 5 may branch from the supply flow passage 3 on the downstream side of the first control valve 16 and on the upstream side of the second control valves 26, 36, 46 and bypass the second control valves 26, 36, 46.

Figure 3:
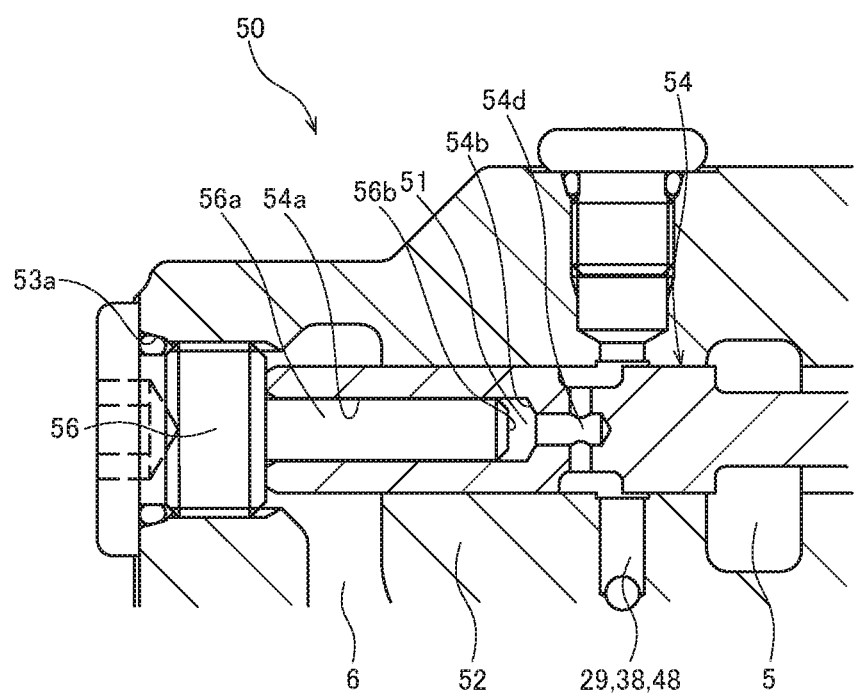
FIG. 3 is a partially enlarged view of a modified example of the pilot type switching valve according to the first embodiment of the present invention.

As shown in FIG. 3, the piston 57 may be integrated with the plug 56. In this case, an insertion portion 56a to be inserted into the insertion borehole 54a is formed in the plug 56, and the pilot chamber 51 is formed between the bottom surface 54b of the insertion borehole 54a and an end surface 56b of the insertion portion 56a. With the pilot type switching valve 50 formed in such a way, the number of parts can be reduced in comparison to a case where the piston 57 is used.

According to the above first embodiment, the following effects are exerted.

In the pilot type switching valve 50, the area of the pressure receiving surface (bottom surface 54b) receiving the pilot pressure in such a manner that the spool 54 is biased in the valve opening direction is smaller than the sectional area of the housing bore 53. Thereby, since an increase in the bias force by the pilot pressure can be suppressed, the increase in the size of the spring 55 for biasing the spool 54 in the valve closing direction can be suppressed.

Even when the diameter of the spool 54 is increased in order to ensure the relief flow rate of the first relief valve 60, due to formation of the pilot chamber 51 between the bottom surface 54b of the insertion borehole 54a and the end surface 57a of the piston 57, that is, due to formation of the pilot chamber 51 in the spool 54, the area of receiving the pilot pressure acting on the spool 54 in the valve opening direction can be reduced. Thereby, since the spring 55 configured to bias the spool 54 in the valve closing direction can be downsized, the increase in the size of the pilot type switching valve 50 can be suppressed while ensuring a large relief flow rate.

For processing of the insertion borehole 54a of the spool 54, such precision that a property of sliding on the piston 57 can be ensured is only required but the same axis as the housing bore 53 or the like is not required. Therefore, the insertion borehole 54a can be manufactured by simple processing. Thereby, with the pilot type switching valve 50, the pilot chamber 51 can be manufactured by simple processing.

Second Embodiment

Figure 4:
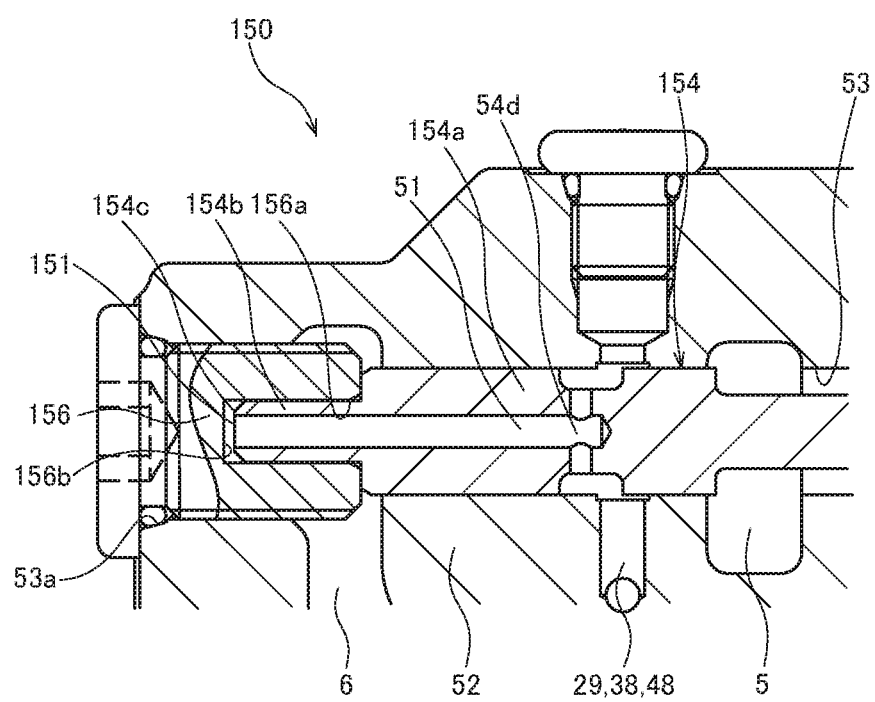
FIG. 4 is a partially sectional view of a pilot type switching valve according to a second embodiment of the present invention.

With reference to FIG. 4, a pilot type switching valve 150 according to a second embodiment of the present invention will be described. Hereinafter, points different from the above first embodiment will be mainly described, and the same configurations as the pilot type switching valve of the first embodiment will be given the same reference signs and description thereof will be omitted.

FIG. 4 is a partially enlarged view of the vicinity of a pilot chamber 151. The second embodiment shown in FIG. 4 is different from the first embodiment in a point that the pilot chamber 151 is provided in a recessed portion 156a formed in a plug 156. Specific description will be given below.

A spool 154 includes a main body portion 154a configured to slide on a housing bore 53, and a projecting portion 154b formed to project from an end surface of the main body portion 154a, the projecting portion having the smaller diameter than the diameter of the main body portion 154a. The main body portion 154a is formed as well as the spool 54 of the first embodiment except the point that no insertion borehole 54a is provided.

A recessed portion 156a into which the projecting portion 154b is slidably inserted is formed in the plug 156. The pilot chamber 151 is formed between a tip end surface 154c of the projecting portion 154b and a bottom surface 156b of the recessed portion 156a. The pilot chamber 151 communicates with pilot passages 28, 38, 48 through a communication passage 54d. Thereby, the leading end surface 154c of the projecting portion 154b functions as a pressure receiving surface on which pilot pressure acts in such a manner that the spool 54 is biased in the valve opening direction.

In the pilot type switching valve 150, the diameter of the projecting portion 154b is smaller than the diameter of the main body portion 154a. Thus, the area of the pressure receiving surface (tip end surface 154c) is reduced. That is, the area of receiving the pilot pressure of the spool 154 (area of the tip end surface 154c) is smaller than the above configuration that the pilot pressure acts on the entire end surface (the end surface having the area which is substantially equal to the sectional area of the housing bore 53) of the spool 154. The pilot type switching valve 150 formed in such a way functions as well as the pilot type switching valve 50 of the first embodiment. Thus, description thereof will be omitted.

According to the above second embodiment, by making the area of the pressure receiving surface (tip end surface 154c) of the pilot chamber 151 smaller than the sectional area of the housing bore 53, the increase in the size of the pilot type switching valve 150 can be suppressed while ensuring the relief flow rate of a first relief valve 60. Further, since the no piston 57 is used in the pilot type switching valve 150, the number of parts can be reduced.

The configurations, the operations, and the effects of the embodiments of the present invention formed as above will be summed up and described.

The pilot type switching valve 50, 150 includes the valve body 52, the housing bore 53 formed in the valve body 52, the housing bore having the opening end 53a, the valve element (spool 54, 154) slidably housed in the housing bore 53, the valve element being configured to allow or block the flow of the working oil to the relief valve (first relief valve 60), the pilot chamber 51, 151 to which the pilot pressure biasing the valve element (spool 54, 154) in the valve opening direction is guided, and the bias member (spring 55) configured to bias the valve element (spool 54, 154) in the valve closing direction. The valve element (spool 54, 154) has the pressure receiving surface (bottom surface 54b, tip end surface 154c) on which the pilot pressure acts in such a manner that the valve element (spool 54, 154) is biased in the valve opening direction, and the area of the pressure receiving surface (bottom surface 54b, tip end surface 154c) is smaller than the sectional area of the housing bore 53.

With this configuration, the area of the pressure receiving surface (bottom surface 54b, tip end surface 154c) receiving the pilot pressure in such a manner that the valve element (spool 54, 154) is biased in the valve opening direction is smaller than the sectional area of the housing bore 53. Thereby, since the increase in the bias force by the pilot pressure can be suppressed, the increase in the size of the bias member (spring 55) for biasing the valve element (spool 54, 154) in the valve closing direction can be suppressed. Therefore, even when the diameter of the valve element (spool 54, 154) is increased in order to ensure the relief flow rate, the area of the pressure receiving surface (bottom surface 54b, tip end surface 154c) can be reduced. Thus, the size increase can be suppressed while ensuring the relief flow rate.

In the pilot type switching valve 50, 150, the relief valve (first relief valve 60) is provided in the valve body 52.

With this configuration, the relief valve (first relief valve 60) is integrated with the valve body 52. Thus, a piping work of the pilot type switching valve 50, 150 and the relief valve (first relief valve 60) can be eliminated and the device can be compactified.

In the pilot type switching valve 50, the valve element (spool 54) has the insertion borehole 54a opened on the end surface, the piston 57 is slidably inserted into the insertion borehole 54a, and the pilot chamber 51 is formed between the bottom surface 54b of the insertion borehole 54a and the end surface 57a of the piston 57.

With this configuration, by using the piston 57, only formation of the insertion borehole 54a in the valve element (spool 54) is required. Thus, manufacture can be made by simple processing.

The pilot type switching valve 50 further includes the plug 56 closing the opening end 53a, the plug being fixed to the valve body 52. The valve element (spool 54) has the insertion borehole 54a opened on the end surface, the plug 56 has the insertion portion 56a inserted into the insertion borehole 54a, and the pilot chamber 51 is formed between the bottom surface 54b of the insertion borehole 54a and the end surface 56b of the insertion portion 56a.

The pilot type switching valve 150 further includes the plug 156 closing the opening end 53a, the plug being fixed to the valve body 52. The valve element (spool 154) has the main body portion 154a configured to slide on the housing bore 53, and the projecting portion 154b formed to project from one end surface of the main body portion 154a, the projecting portion having the smaller diameter than the diameter of the main body portion 154a, the plug 156 has the recessed portion 156a into which the projecting portion 154b is inserted, and the pilot chamber 151 is formed between the end surface (tip end surface 154c) of the projecting portion 154b and the bottom surface 156b of the recessed portion 156a.

With these configurations, the number of parts can be reduced in comparison to the case where the piston 57 is used.

Embodiments of this invention were described above, but the above embodiments are merely examples of applications of this invention, and the technical scope of this invention is not limited to the specific constitutions of the above embodiments.

For example, the first relief valve 60 and the second relief valve 70 may be switched by the spool 54, 154 of the pilot type switching valve 50, 150. In this case, a land portion for opening or blocking a flow passage communicating with the second relief valve 70 is added to the spool 54, 154.

This application claims priority based on Japanese Patent Application No. 2016-13993 filed with the Japan Patent Office on Jan. 28, 2016, the entire contents of which are incorporated into this specification.

The invention claimed is:

1. A pilot type switching valve provided on the upstream side of a relief valve to be opened to discharge a working fluid to a tank when pressure of a supply flow passage connected to a pump reaches a predetermined value, the pilot type switching valve comprising:
   a valve body;
   a housing bore formed in the valve body, the housing bore having an opening end;
   a valve element slidably housed in the housing bore, the valve element being configured to allow or block a flow of the working fluid to the relief valve;
   a pilot chamber to which pilot pressure biasing the valve element in the valve opening direction is guided; and
   a bias member configured to bias the valve element in the valve closing direction, wherein
   the valve element has a pressure receiving surface on which the pilot pressure acts in such a manner that the valve element is biased in the valve opening direction, and
   the area of the pressure receiving surface is smaller than the sectional area of the housing bore,
   wherein the valve element has an insertion borehole opened on an end surface,
   a piston is slidably inserted into the insertion borehole, and
   the pilot chamber is formed between a bottom surface of the insertion borehole and an end surface of the piston.

2. The pilot type switching valve according to claim 1, wherein
   the relief valve is provided in the valve body.

3. A pilot type switching valve provided on the upstream side of a relief valve to be opened to discharge a working fluid to a tank when pressure of a supply flow passage connected to a pump reaches a predetermined value, the pilot type switching valve comprising:
   a valve body;
   a housing bore formed in the valve body, the housing bore having an opening end;
   a valve element slidably housed in the housing bore, the valve element being configured to allow or block a flow of the working fluid to the relief valve;

a pilot chamber to which pilot pressure biasing the valve element in the valve opening direction is guided;

a bias member configured to bias the valve element in the valve closing direction; and a plug closing the opening end, the plug being fixed to the valve body, wherein the valve element has a pressure receiving surface on which the pilot pressure acts in such a manner that the valve element is biased in the valve opening direction, the area of the pressure receiving surface is smaller than the sectional area of the housing bore, the valve element has an insertion borehole opened on an end surface, the plug has an insertion portion inserted into the insertion borehole, and the pilot chamber is formed between a bottom surface of the insertion borehole and an end surface of the insertion portion.

4. The pilot type switching valve according to claim 3, wherein the relief valve is provided in the valve body.

5. A pilot type switching valve provided on an upstream side of a relief valve to be opened to discharge a working fluid to a tank when a pressure of a supply flow passage connected to a pump reaches a predetermined value, the pilot type switching valve comprising:

a valve body;

a housing bore formed in the valve body, the housing bore having an opening end;

a valve element slidably housed in the housing bore, the valve element being configured to allow or block a flow of the working fluid to the relief valve;

a pilot chamber to which pilot pressure biasing the valve element in the valve opening direction is guided;

a bias member configured to bias the valve element in the valve closing direction; and a plug closing the opening end, the plug being fixed to the valve body, wherein the valve element has:

a main body portion configured to slide on the housing bore; and a projecting portion formed to project from an end surface of the main body portion, the projecting portion having the smaller diameter than the diameter of the main body portion, the plug has a recessed portion into which the projecting portion is inserted, and the pilot chamber is formed between an end surface of the projecting portion and a bottom surface of the recessed portion.

6. The pilot type switching valve according to claim 5, wherein the relief valve is provided in the valve body.

* * * * *